United States Patent [19]

Powell

[11] Patent Number: 5,473,474
[45] Date of Patent: Dec. 5, 1995

[54] PANORAMIC LENS

[75] Inventor: Ian Powell, Gloucester, Canada

[73] Assignee: National Research Council of Canada, Ottawa, Canada

[21] Appl. No.: 101,533

[22] Filed: Jul. 16, 1993

[51] Int. Cl.[6] ............................. G02B 13/06; G02B 17/08
[52] U.S. Cl. ............................................ 359/725; 359/729
[58] Field of Search ................................... 359/725, 728, 359/729

[56] References Cited

U.S. PATENT DOCUMENTS

| | | | |
|---|---|---|---|
| 2,638,033 | 5/1953 | Buchele et al. | 359/725 |
| 3,283,653 | 11/1966 | Tokarzewski | 359/725 |
| 3,505,465 | 4/1970 | Rees | 359/725 |
| 4,395,093 | 7/1983 | Rosendahl | 359/725 |
| 4,429,957 | 2/1984 | King | 359/725 |
| 4,566,763 | 1/1986 | Greguss | 359/725 |

FOREIGN PATENT DOCUMENTS

| | | |
|---|---|---|
| 071492 | 2/1983 | European Pat. Off. . |
| 556042 | 8/1993 | European Pat. Off. . |
| 1248324 | 8/1967 | Germany . |
| 59-155821 | 9/1984 | Japan . |
| 6-003593 | 1/1994 | Japan . |

Primary Examiner—Scott J. Sugarman
Attorney, Agent, or Firm—Juliusz Szereszewski

[57] ABSTRACT

A panoramic imaging system for projecting a 360 degree cylindrical field of view onto a two-dimensional annular format has a panoramic imaging block with a concentric axis of symmetry, two refractive surfaces and two reflective surfaces. The first reflective surface is a concave conicoid of revolution with the conic constant in the range from −0.6 to +2.0. In an embodiment of the invention, the second refractive surface (the last in the path of rays) is flat, while the first reflective surface, the second reflective surface and the first refractive surface are all spherical.

9 Claims, 8 Drawing Sheets

5,473,474

PANORAMIC LENS

FIELD OF THE INVENTION

This invention relates to a panoramic imaging system for projecting a 360 degree cylindrical field of view onto a two-dimensional annular format. In particular, it relates to a panoramic imaging block which is a vital part of the system.

BACKGROUND OF THE INVENTION

There are many presently known panoramic viewing optical arrangements which use lenses, or optical blocks, of various shapes. Examples of such arrangements are described in U.S. Pat. No. 3,552,820 to Brachvogel; U.S. Pat. No. 4,395,093 to Rosendahl et al; U.S. Pat. No. 4,484,801 to Cox: and U.S. Pat. 4,566,763 to Greguss. Each of these has its own advantages and disadvantages.

In particular, the Greguss patent proposes a panoramic block such that light entering it undergoes a total of two refractions and two reflections before exiting. Both reflective surfaces are paraboloidal in shape for achieving, according to the specification, nearly faultless imagery. Each of these surfaces can be replaced, according to the specification, with a surface having a radius of the "best fit" sphere for a still acceptable image quality.

While the general concept of the Greguss'0 patent is useful, it has been found by analyzing his system in detail that it is faulty in certain aspects. The utilization of paraboloidal reflective surfaces and a telecentric exit pupil actually compromise the performance of the design of the overall system rather than enhancing it. It can be proven that the Greguss system would work better with spherical reflective surfaces than with paraboloidal ones.

Further, the Greguss patent does not address any relay optics or relay lens in detail. Such lens, or a relay system following the primary component (panoramic block) is not only important but necessary for transferring the intermediate image, formed somewhere in the primary block, further on to produce a real accessible image on, for example, a CCD camera.

SUMMARY OF THE INVENTION

It is an object of the invention to provide a panoramic lens system for imaging of a cylindrical 360 degree field of view onto a two-dimensional annular format.

It is a further object of the invention to provide a panoramic lens, or optical block, having two reflective surfaces and two refractive surfaces, with improved optical properties compared to those of the corresponding prior art optical blocks.

According to the invention, there is provided a panoramic imaging block having a concentric axis of symmetry, and comprising two refractive surfaces and two reflective surfaces disposed so as to enable light ray bundles to enter the block through a first refractive surface, undergo reflection from the first reflective surface, the second reflective surface, and exit through the second refractive surface thereby to produce an annular image from a cylindrical field of view around the axis of symmetry. Both reflections take place within the block. The first reflective surface is a concave conicoid of revolution whose conic constant generally lies somewhere in the range from −0.6 to +2.0, ie. anywhere from an ellipsoidal surface to an oblate spheroid (including a sphere).

The above feature gives rise to a number of embodiments of the invention. In one such embodiment the second refractive surface is flat and the other surfaces spherical with the reflective ones having equal but opposite powers.

The second reflective surface is a convex conicoid of revolution whose asphericity (departure from a sphere) is strongly dependent on the amount of asphericity associated with the first reflective surface. When the asphericity of the first reflective surface is such that its conic constant is numerically less than about −0.4, the optimum shape for the second reflective surface to yield acceptable performance is strongly ellipsoidal, with a conic constant less than −2.0, down to about −10, with the proviso that generally, lower values of the conic constant of the first reflective surface correspond to lower values of the conic constant of the second reflective surface and vice versa.

Besides exhibiting good aberration correction over the entire image formed inside the block, another important characteristic of the optical block of the invention is to provide some form of pupil imagery. Imaging of the central region of the block onto the space occupied by the relay lens means that the latter would be working less hard in performing imagery from the intermediate to final image plane. As is found with most complex optical systems, locating the stop near their geometric centres tends to make the systems work more naturally and at the same time reduce the size of the elements involved.

In other embodiments, depending on the application, the first reflective surface can be an ellipsoid or an oblate spheroid with a conic constant in the range from −0.6 to +2.0 with the second reflective surface and the two refractive surfaces having some conic form. The exact form that these surfaces will take for optimum shape depends on a number of factors such as the shape of the first reflective surface, the refractive index of the material, field of view orthogonal to the 360 degrees, numerical aperture, location of the effective stop, etc.

The invention further addresses the relay optical system for relaying the intermediate image created by the optical block to an accessible location downstream from the optical system. It is the relay lens which is typically of a double gauss construction, if the spectral range under consideration lies within the visible region, which defines the actual stop of the system rather than some surface within the block itself.

BRIEF DESCRIPTION OF THE DRAWINGS

Further features and properties of the invention will be described in more detail hereinbelow in conjunction with the accompanying drawings in which.

DETAILED DESCRIPTION OF THE INVENTION

Figure 1:
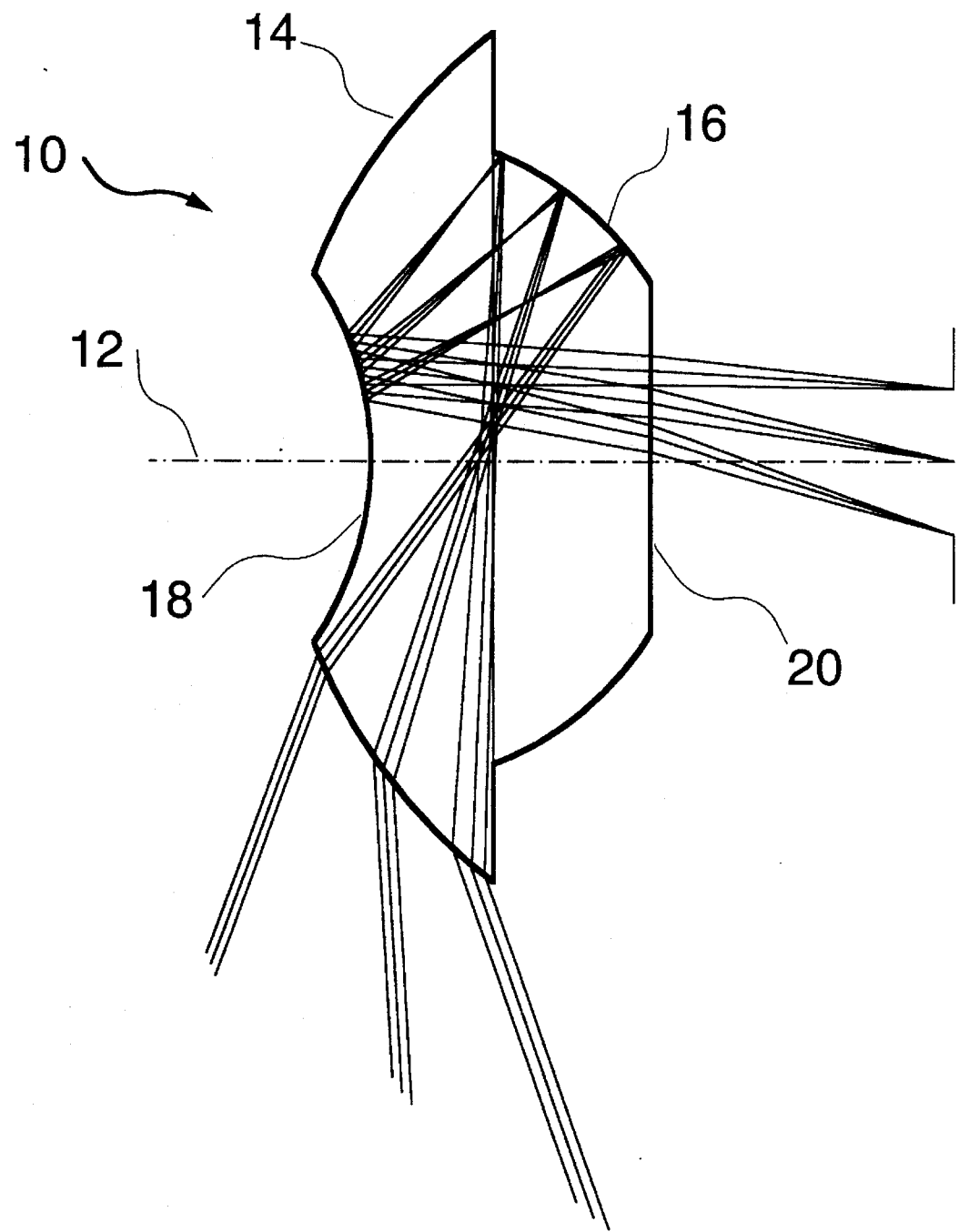
FIG. 1 is a sectional side view of an embodiment of the optical block of the present invention.

The concept of the Greguss U.S. Pat. No. 4,566,763 was analyzed extensively. After certain disadvantages of that design as described were defined, work was undertaken to optimize the design.

Investigation of the design of the panoramic lens block revealed that the relationship between the various surfaces is a complex one. Many variations of the design indeed exist including designs in which the surfaces, either the refractive or reflective ones, are aspheric, for example ellipsoidal, paraboloidal, hyperboloidal or oblate spheroids. However, it has been found that it is possible to achieve excellent image quality using the combination whereby the first refractive surface and the two reflective surfaces are spherical and the second refractive surface is flat. Furthermore, for certain applications, the two reflective surfaces can have identical radii of curvature with minimal impact on performance.

The difference between a spherical shape and the "best fit sphere" as used by Greguss will be easily appreciated by those versed in the art.

In our investigation of the design, the first reflective surface was also found to be the most sensitive to aspherization while the second refractive surface the least sensitive. It was noted that as the first reflective surface becomes more paraboloidal in shape, ie. as its conic constant approaches $-1.0$, the performance of the unit breaks down. This breakdown applies to both ordinary object to image imagery and pupil imagery. In sharp contrast to examples which exhibit good performance, in the case where both reflective surfaces are paraboloidal in shape (this is the case for which Greguss states near perfect imagery), pupil imagery is so poor that the ray bundles associated with different field positions fail to intersect at roughly the same point within the panoramic lens block on their way to an external well-defined stop associated with some relay optics located downstream. This poor pupil imagery is accompanied by a significant degradation in the quality of the image produced.

In all the embodiments of the invention the first reflective surface and first refractive surface have positive power, while the second reflective surface has negative power. The second refractive surface can have positive or negative power or none at all.

While the index of refraction of the material of the block does impact on the optimum design shape, it does not appear to be that critical to the workings of the design, since solutions are easily available for indices in the range from 1.4 to 2.0.

Depending on the actual application, the conic constant range of the first reflective surface over which acceptable performance can be expected is between $-0.6$ to $+2.0$. The breakdown appears to be less critical for positive values of the conic constant than negatives ones.

Although the location of the external stop determines to some degree how "hard" the relay lens is working, i.e. if it is working in an asymmetrical fashion, it is not a critical factor with respect to the complexity and the performance of the design of the block itself.

Further improvement in image quality for some applications could be obtained by introducing small amounts of higher order aspherization on top of making the surfaces conicoids of revolution. The first reflective surface can depart from the true conicoid (ellipsoid, paraboloid etc.) by an amount given by the perturbation component $\Delta z$ according to the expression $$\Delta z = a_1 p^4 + a_2 p^6 + a_3 p^8 + a_4 p^{10}$$

where p is the semi-diameter, and $a_1$, $a_2$, $a_3$ and $a_4$ are aspheric surface coefficients.

While there exists a fair degree of flexibility in the design of a panoramic optical block, the overall size and shape depends to a large extent on the conic constant associated with the first reflective surface, ie. whether the surface is ellipsoidal, oblate spheroidal or simply spherical. As the value of the conic constant becomes more negative, the block takes on a more asymmetrical look with the diameter of the front surface being significantly larger than its rear counterpart.

For comparison purposes, each of the following exemplary optical blocks was computer-designed to image a 360×40 degree field of view onto a 10.0 mm diameter image format with a numerical aperture equivalent to F/5. Unless stated to the contrary the material used was CaF2, a crystalline substance having a refractive index of 1.43 and which unlike optical glass can be readily machined on a diamond turning machine. This allows the optical designer the freedom to aspherize the surface(s) and be confident that they are still manufacturable.

The following examples have been provided by computer modelling, a well-established and reliable method of optical design.

EXAMPLE 1

Referring now to the drawings, FIG. 1, corresponding to Example 1, illustrates an imaging lens 10 having an axis of symmetry 12. The lens 10 has a first refractive spherical surface 14 with radius of curvature 20.87 mm, a first reflective spherical surface 16 with radius of curvature $-12.67$ mm, a second spherical reflective surface 18 with radius of curvature $-12.67$ mm and a flat second refractive surface 20 (the flat surface can also be considered as spherical, with the radius being infinity). The diameter of the lens is 33.0 mm and its vertex thickness 11.25 mm. The step in the outside diameter from the first refractive surface 14 to the first reflective surface 16 provides for an abutment for convenient mounting of the lens 10 in a cell without introducing any unwanted vignetting or for other purposes.

Figure 2:
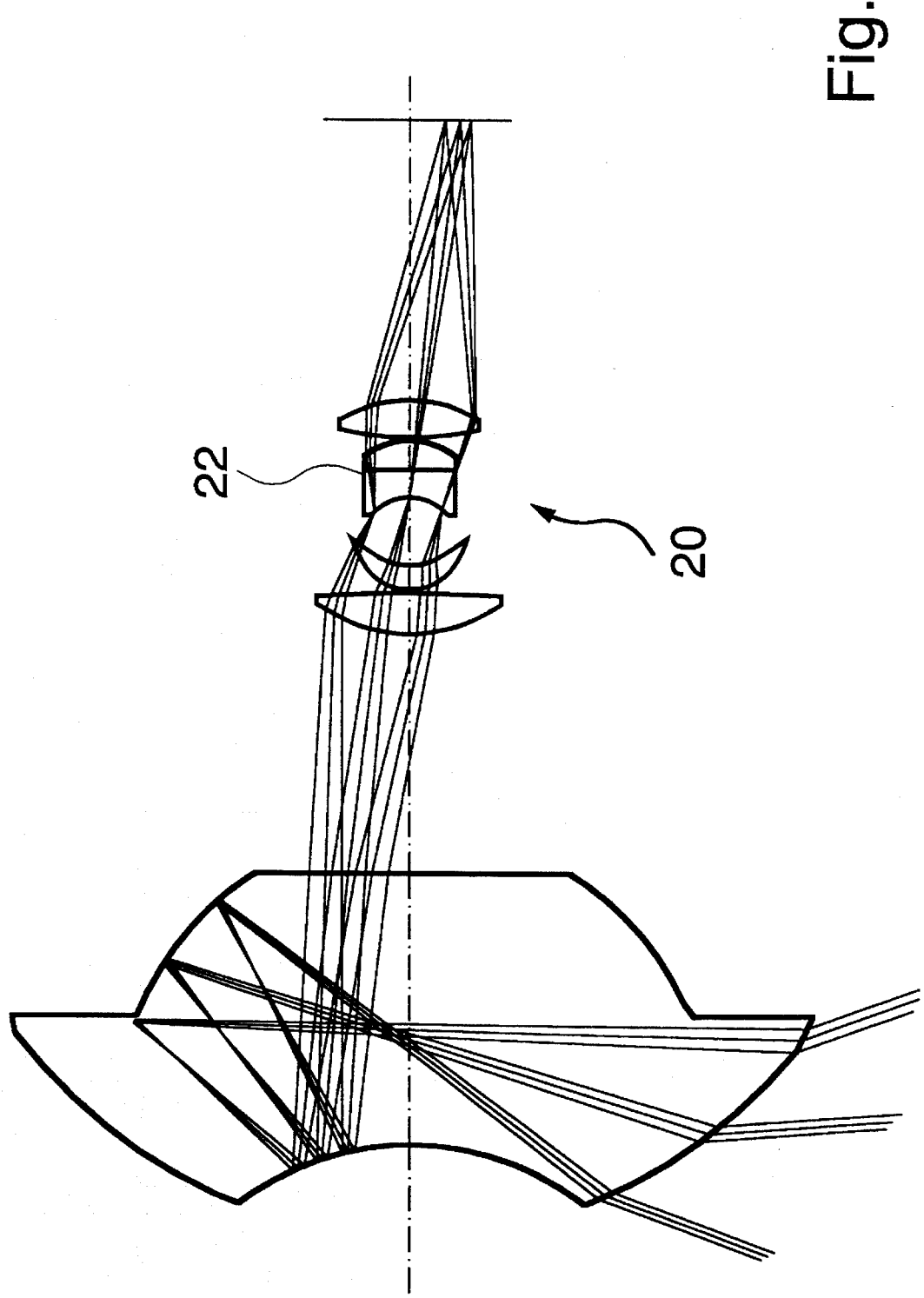
FIG. 2 is a sectional side view of the first embodiment in combination with a relay optical system.

In the actual panoramic imaging system, the lens 10 is complemented by a relay imaging system 20 shown in FIG. 2. The relay system 20 has a double gauss construction which is common for this type of application. The relay system 20 has an aperture stop 22 located within it.

The lens 10 shown in FIG. 1 in combination with the relay system 20 can project a field of view of 360×40 degrees onto a two dimensional annular format coincident with a CCD array, as shown schematically in FIG. 2. This means that the lens functions over an equivalent field angle range from ±70 to ±110 degrees.

It is known in the art that in the design of a complex optical system which comprises a number of lens groups having different functions, each group (in this case group 10 and 20), is corrected within itself and the entire system reoptimized as a unit.

FIG. 1 further depicts the passage of 3 bundles of rays through the optical block 10. It can be seen that the rays central to each bundle (pupil rays) exiting the block 10 converge to the centre of the external stop 22 located at a convenient point downstream.

Likewise, FIG. 2 depicts the passage of the same three ray bundles through the complete optical system.

EXAMPLE 2

Figure 3:
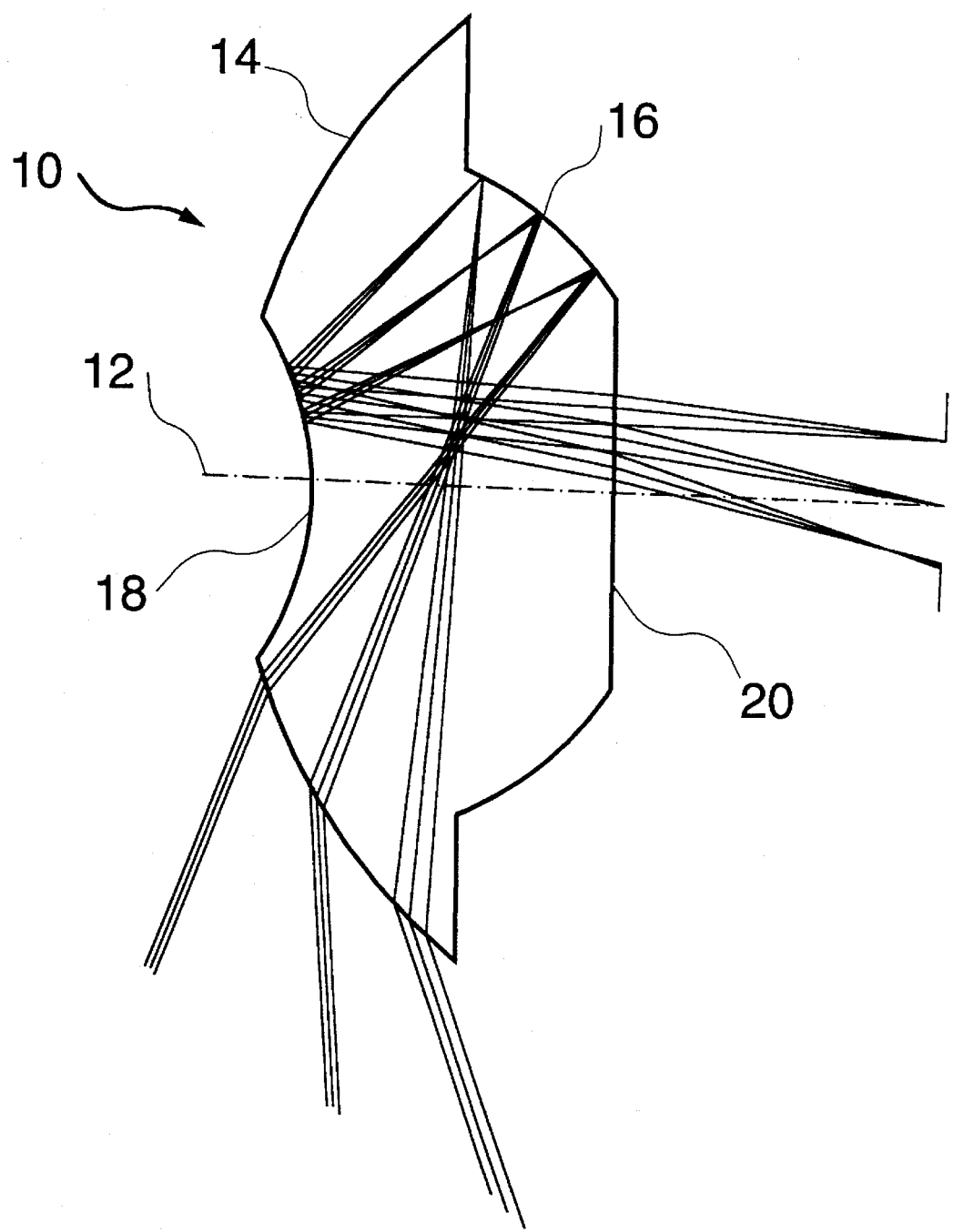
FIG. 3 is a sectional side view of another embodiment of the present invention.

In FIG. 3, another embodiment of the optical block is shown. The major difference between example 2 and example 1 is that in Example 2, the first reflective surface is an oblate spheroid rather than a simple sphere. The lens 10 has a first refractive spherical surface 14 with radius of curvature 23.91 mm, a first reflective surface 16 with radius of curvature −14.46 mm, a second reflective surface 18 with radius of curvature −14.46 mm and a flat second refractive surface 20. The conic constant associated with the first reflective surface is +1.00. The diameter of the lens is 35.7 mm and its vertex thickness is 12.58 mm. Although the conic constant of the first reflective surface could be increased somewhat, it is apparent from FIG. 3 that the pupil imagery is beginning to break down somewhat with the point of intersection of the pupil rays moving away from the optical axis and away from what could be described as the centre of symmetry of the panoramic block.

EXAMPLE 3

Figure 4:
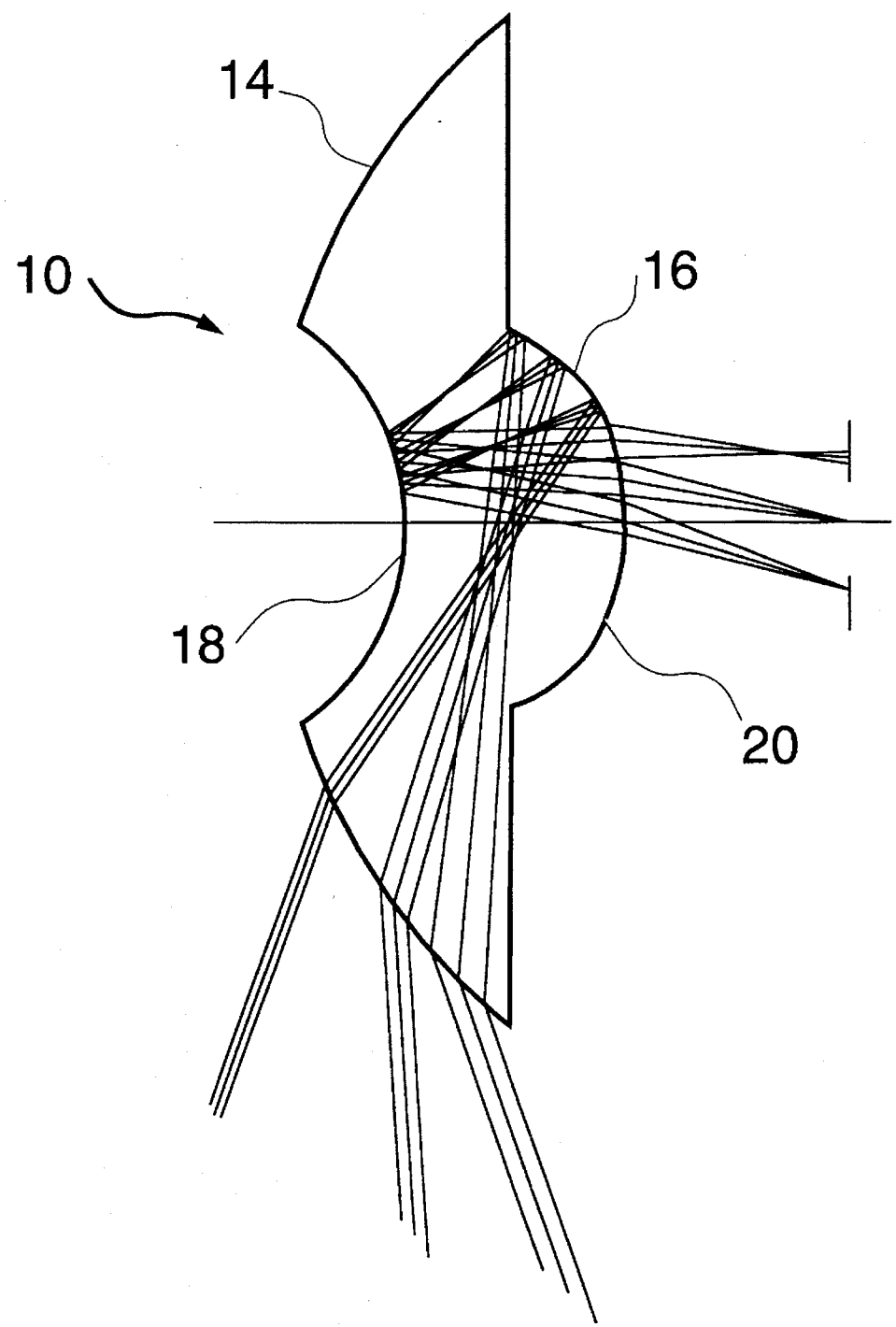
FIG. 4 is a sectional side view of still another embodiment of the invention.

In FIG. 4, still another embodiment of the optical block is shown. The major differences between Example 3 and Example 1 is that in Example 3, all surfaces are ellipsoidal in shape rather than simple spheres. The lens 10 has a first refractive surface 14 with radius of curvature 23.23 mm, and a conic constant −0.12, a first reflective surface 16 with radius of curvature −6.59 mm, and a conic constant −0.40, a second reflective surface 18 with radius of curvature −7.48 mm, and a conic constant −4.68, and a second refractive surface 20 with radius of curvature −9.21 mm, and a conic constant −0.31. The diameter of the lens is 38.0 mm and its vertex thickness 8.53 mm. Although the conic constant associated with the first reflective surface could be made more negative, it is apparent from FIG. 4 that the pupil imagery, as found with Example 2, is starting to break down with the point of intersection of the pupil rays moving away from the optical axis.

EXAMPLE 4

Figure 5:
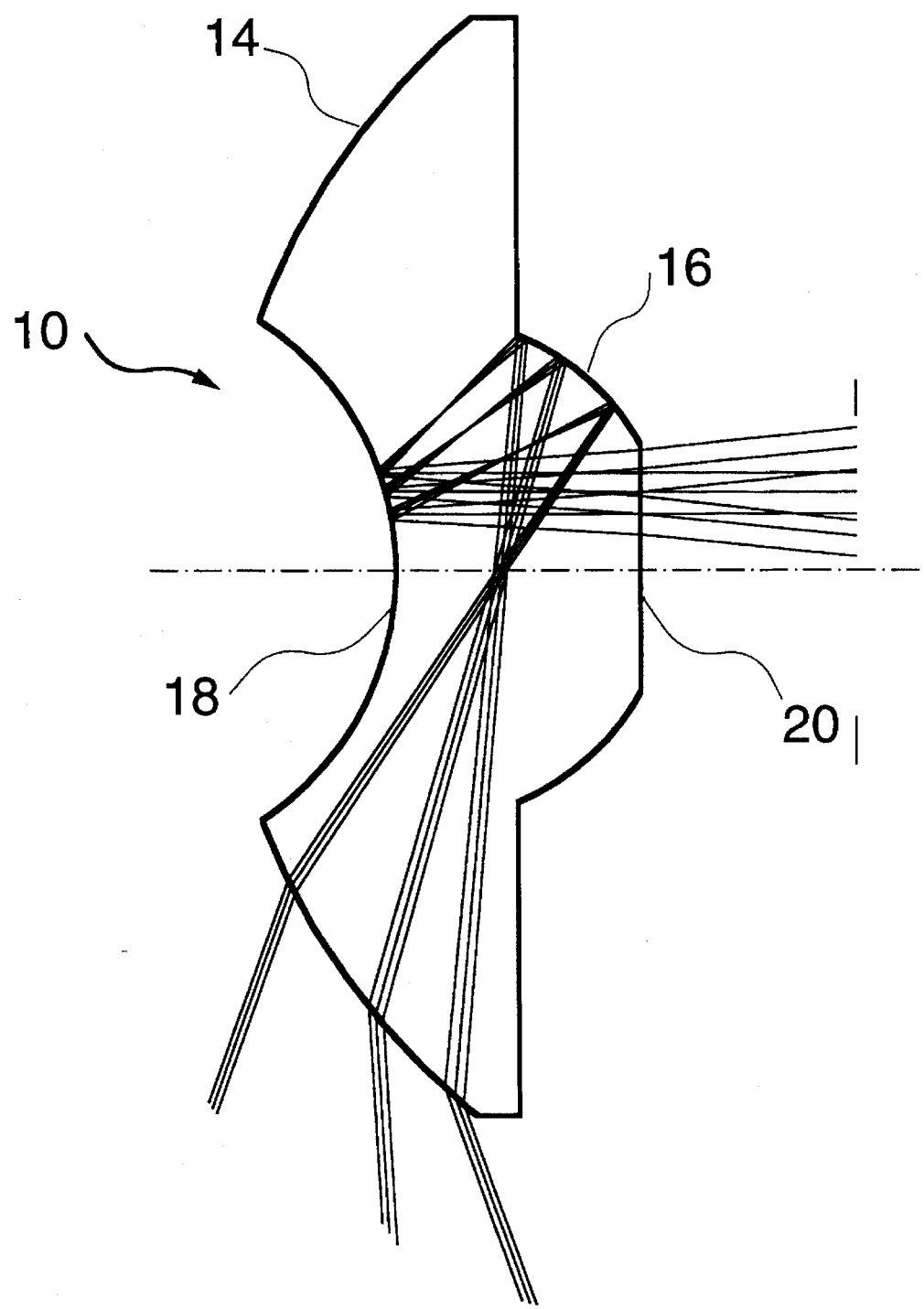
FIG. 5 is a sectional side view of still another embodiment.

In FIG. 5, yet another embodiment of the optical block is shown. In this example the optical block is forced to work in the telecentric mode with the exit pupil located at infinity. While this subjects the relay optics downstream to work harder, the aberration correction within the optical block itself is excellent. The lens 10 has a first refractive spherical surface 14 with radius of curvature 30.98 mm and a conic constant −0.61, a first reflective surface 16 with radius of curvature −12.44 mm and a conic constant −0.14, a second reflective surface 18 with radius of curvature −12.55 mm and a conic constant −0.54, and a flat second refractive surface 20. The diameter of the lens is 54.0 mm and its vertex thickness, 12.47 mm.

EXAMPLE 5

Figure 6:
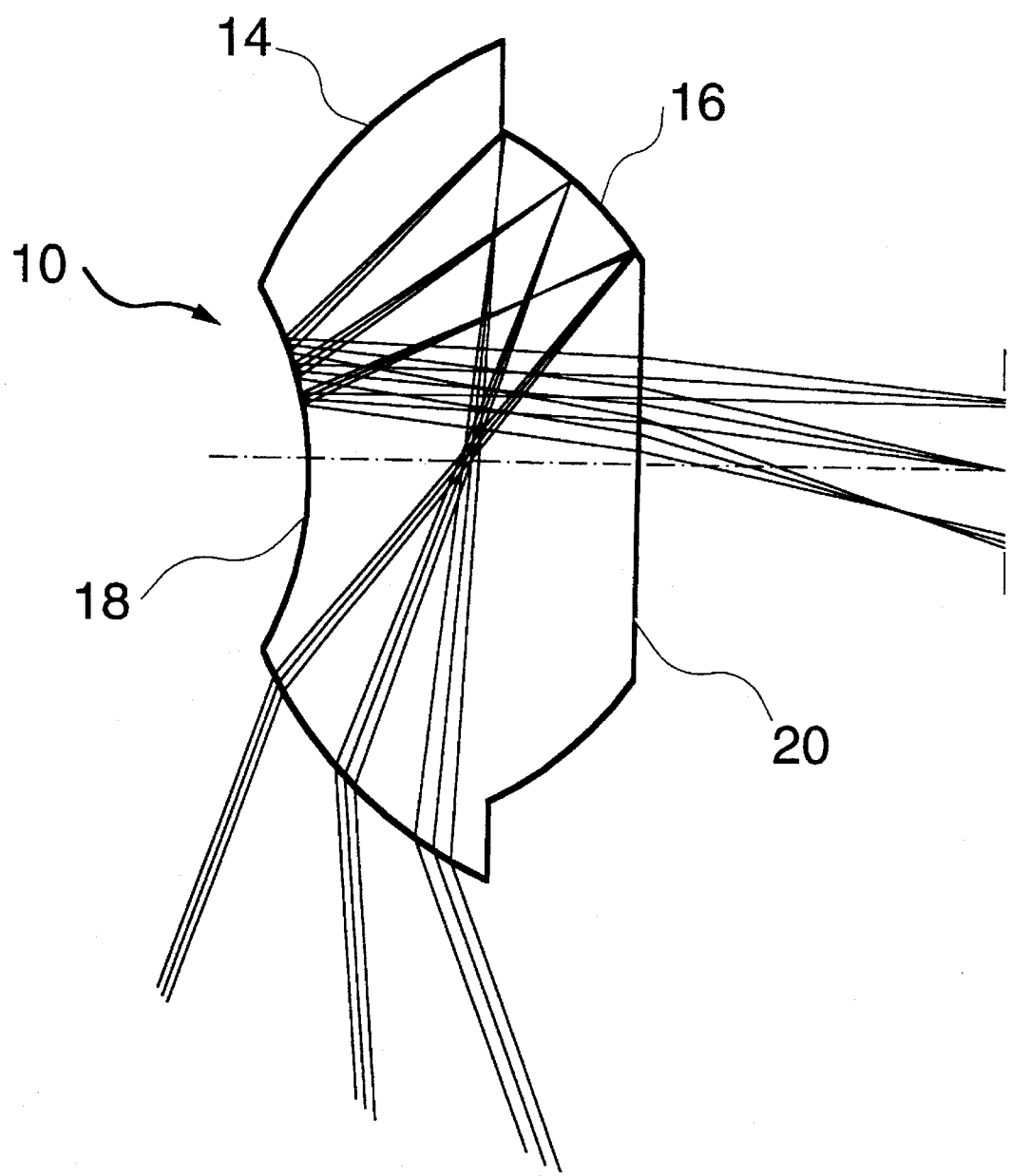
FIG. 6 is a sectional side view of yet another embodiment.

In FIG. 6, another embodiment of the optical block is shown. In this example the material used is the optical glass SF6 which has a refractive index of 1.81. The lens 10 has a first refractive spherical surface 14 with radius of curvature 17.13 mm and a conic constant −0.04; a first reflective surface 16 with radius of curvature −13.39 mm and conic constant −0.06; a second reflective surface 18 with radius of curvature −15.19 mm and a conic constant +0.49, and a flat second refractive surface 20. The diameter of the lens is 31.0 mm and its vertex thickness 12.94 mm. Because the dispersion associated with the glass SF6 is about 4 times that of CaF2, the colour correction is much poorer with roughly a four-fold increase in the chromatic blurring.

EXAMPLE 6

Figure 7:
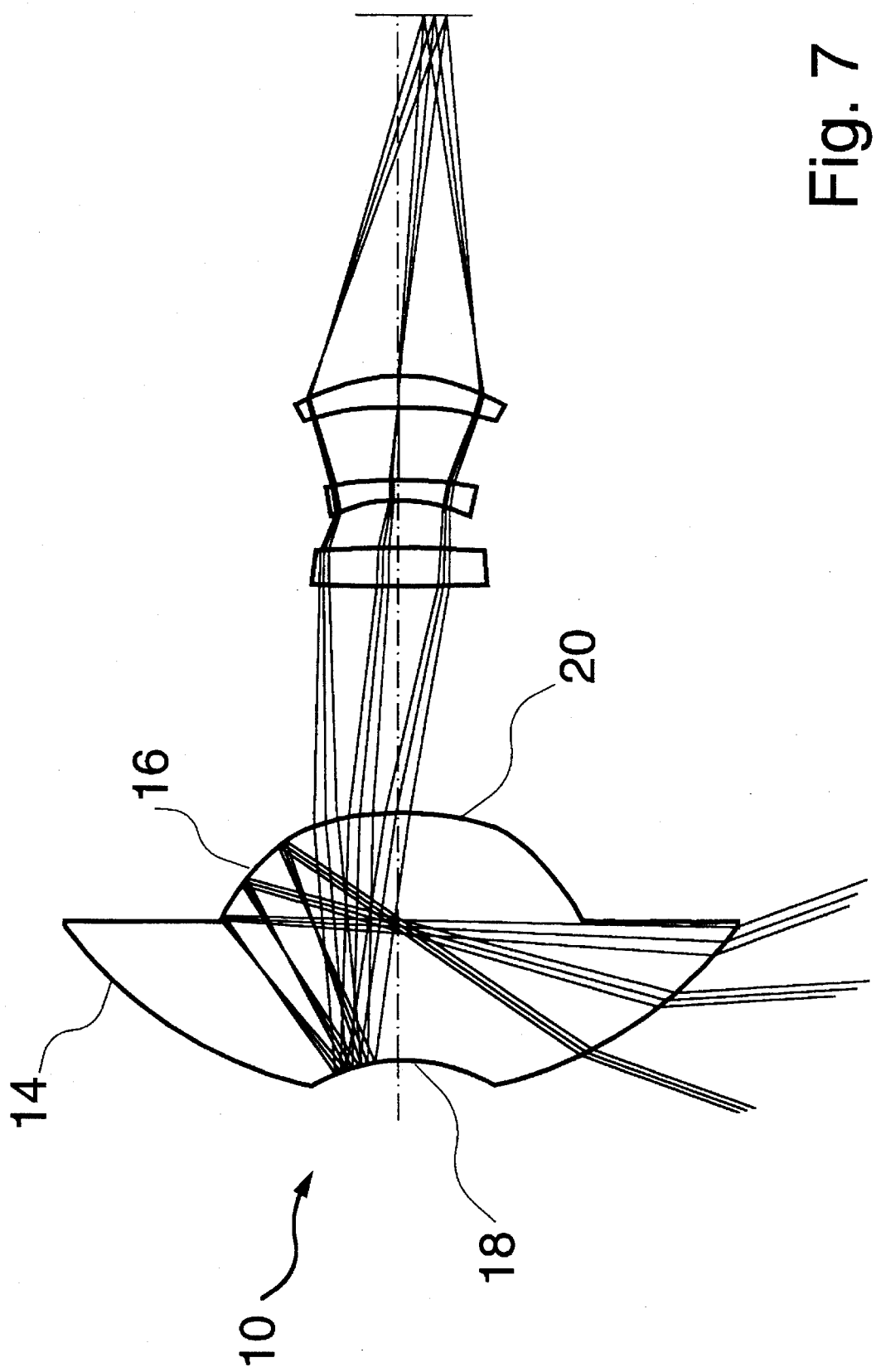
FIG. 7 is a sectional side view of still another embodiment in combination with a relay optical system working in the infrared part of the spectrum.

Another embodiment of the optical block is shown in FIG. 7. In this example, the optical block is used in conjunction with a relay optical system operating over the infra-red spectrum from 3 to 5 μm. The materials associated with the relay optics are germanium and silicon. The lens 10 has a first refractive spherical surface 14 with radius of curvature 20.39 mm and a conic constant −0.27, a first reflective surface 16 with radius of curvature −9.46 mm and conic constant −0.23, a second reflective surface 18 with radius of curvature −9.60 mm and a conic constant −1.46, and the second refractive spherical surface 20 with radius of curvature −14.22 mm and a conic constant −0.29. The diameter of the lens is 35.0 mm and its vertex thickness 12.81 mm.

EXAMPLE 7

Figure 8:
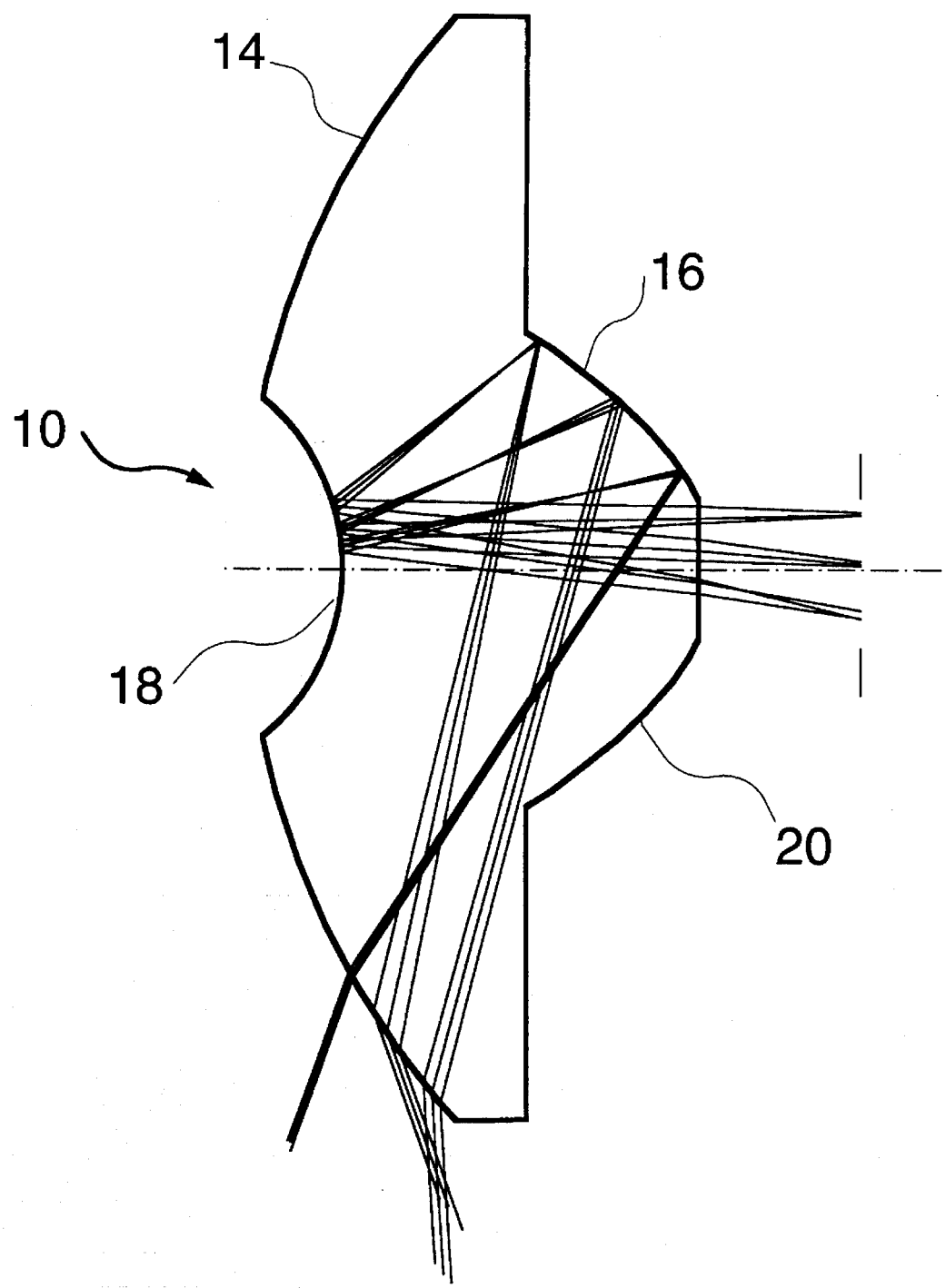
FIG. 8 is a sectional side view of still another embodiment of the present invention.

In FIG. 8, another embodiment of the optical block is shown. However, as can be seen from the passage of the ray bundles through the optical block the situation is vastly different from what is found with the other examples described herein. In Example 6, both the reflective surfaces were forced to be paraboloidal in shape, as proposed in the Greguss patent. All other parameters associated with the optical block were then allowed to vary in the optimization of its performance. The variable parameters included the radii of curvature of all surfaces, the conic constants associated with the refractive surfaces and the vertex thickness of the optical block. The prescription for this arrangement is as follows: the first refractive spherical surface 14 has a radius of curvature 57.54 mm and a conic constant +0.20; the first reflective surface 16 has a radius of curvature −9.92 mm and a conic constant −1.00; the second reflective surface 18 has a radius of curvature −14.14 mm and a conic constant −1.00, and the second refractive surface 20 has a radius of curvature −106.08 mm, and a conic constant −0.18. The diameter of the lens is 73.0 mm and its vertex thickness 25.70 mm. Not only is the performance associated with this example extremely poor but the diameter of the element is objectionably large for the image size being produced.

While numerous other examples can be devised and modifications will occur to those versed in the art, all such modifications are to be considered part of the invention as long as they fall within the scope of the invention as defined by the appended claims.

I claim:

1. A panoramic imaging block having a concentric axis of symmetry and comprising two refractive surfaces and two reflective surfaces disposed such as to allow light rays to enter the block through a first refractive surface, undergo reflection from the first reflective surface, the second reflective surface, and exit through the second refractive surface thereby to produce an annular image from a cylindrical field of view around the axis of symmetry, wherein the first reflective surface is an aspherical concave conicoid of revolution, the conic constant of which is in the range from −0.6 to +2.0.

2. A panoramic imaging block according to claim 1 wherein the second reflective surface is a convex conicoid of revolution whose asphericity is dependent on the amount of asphericity associated with the first reflective surface such that when the conic constant of the first reflective surface is numerically less than −0.4, the second reflective surface is ellipsoidal with a conic constant from about −2.0 to about −10, smaller values of the conic constant of the first reflective surface corresponding to smaller values of the conic constant of the second reflective surface.

3. The panoramic imaging block according to claim 1 wherein the second refractive surface is flat, and the first reflective surface, the second reflective surface and the first refractive surface are all spherical.

4. The panoramic imaging block according to claim 1 where the first reflecting surface departs from a true conicoid by an amount given by the perturbation component $\Delta z$ according to the expression $$\Delta z = a_1 p^4 + a_2 p^6 + a_3 p^8 + a_4 p^{10}$$

where p is the semi-diameter, and $a_1$, $a_2$, $a_3$ and $a_4$ are aspheric surface coefficients.

5. The panoramic imaging block according to claim 1 wherein the first refractive surface and the first reflective surface have a positive power while the second reflective surface has a negative power.

6. The panoramic imaging block according to claim 1 further having a circumferential step between the first refractive surface and the first reflective surface.

7. A panoramic imaging system for projecting a cylindrical field of view onto a two-dimensional format comprising a panoramic imaging block having a concentric axis symmetry and comprising two refractive surfaces and two reflective surfaces disposed such as to allow light rays to enter the block through a first refractive surface, undergo reflection from the first reflective surface, the second reflective surface, and exit through the second refractive surface thereby to produce an annular image from a cylindrical field of view around the axis of symmetry, wherein the first reflective surface is an aspherical concave conicoid of revolution, the conic constant of which is in the range from −0.6 to +2.0, and a relay optical system of a double gauss design for transferring an intermediate image created by the imaging block to an accessible location.

8. A panoramic imaging system according to claim 7 wherein the relay optical system comprises an aperture stop.

9. The panoramic imaging system according to claim 7 wherein the aperture stop is disposed approximately at an optical center of the relay system.

* * * * *